United States Patent [19]

Faber et al.

[11] Patent Number: 4,698,798
[45] Date of Patent: Oct. 6, 1987

[54] DEVICE FOR TRANSLATING A SLIDE

[75] Inventors: Johannes W. Faber, Eindhoven, Netherlands; Peter J. M. Janssen, Colorado Springs, Colo.

[73] Assignee: U.S. Philips Corporation, New York, N.Y.

[21] Appl. No.: 800,013

[22] Filed: Nov. 20, 1985

[30] Foreign Application Priority Data

Jul. 11, 1985 [NL] Netherlands .......................... 8501991

[51] Int. Cl.$^4$ ............................................... G11B 3/36
[52] U.S. Cl. .................................... 369/219; 369/249; 384/42
[58] Field of Search ............... 369/244, 219, 249, 215, 369/220, 224; 384/42

[56] References Cited

U.S. PATENT DOCUMENTS

| | | | |
|---|---|---|---|
| 2,637,563 | 5/1953 | Rescsanski et al. | 369/249 |
| 3,622,163 | 11/1971 | Bachman | 369/249 |
| 3,954,272 | 5/1976 | Leedom | 369/249 |
| 3,993,316 | 11/1976 | Fairbanks | 369/249 |
| 4,342,109 | 7/1982 | Stewart | 369/249 |
| 4,583,212 | 4/1986 | Koide et al. | 369/219 |

Primary Examiner—Steven L. Stephan
Attorney, Agent, or Firm—F. Brice Faller

[57] ABSTRACT

A device for translating a slide comprises a frame 15, a first guide rod 17A, a second parallel guide rod 17B, and first and second bearing means which cooperate with respective guide rods. The slide 13 is rectilinearly movable along an X-axis of an orthogonal triaxial system further comprising a Y-axis and a Z-axis. The first bearing means comprises a first bearing sleeve 19A1 and a second bearing sleeve 19A2, the slide being supported against movement along the Y-axis and Z-axis by the first bearing sleeve 19A1 and a first guide rod 17A and against movement along the Z-axis by the second bearing sleeve 19A2 and the first guide rod 17A. The second bearing means comprises a bearing sleeve 19B which together with the second guide rod 17B supports the slide against movement along the Y-axis and the Z-axis.

5 Claims, 7 Drawing Figures

DEVICE FOR TRANSLATING A SLIDE

BACKGROUND OF THE INVENTION

The invention relates to a device for translating a slide, which device comprises a frame and mutually parallel first and second guide rods. First and second bearing means cooperate with respective guide rods to guide the slide relative to the frame in a rectilinear path along a first axis of an orthogonal triaxial system.

Netherlands Patent Application 8204981 (PHN 10.530, herewith incorporated by reference) discloses a device employed in an electrodynamic apparatus for translating an objective along a radial path relative to a disc which rotates about an axis of rotation. The object is arranged on a slide which can be translated relative to the frame along the radial path. The two parallel guide rods are of circular cross-section and are secured to the frame; four conventional bearing sleeves which are secured to the frame cooperate pairwise with the guide rods. The bearing sleeves comprise cylindrical bearing members which fit coaxially around the guide rods in such a way that a specific clearance exists between the guide rods and the bearing members. The slide is driven by two permanent-magnetic stator magnets parallel to the path and secured to the frame and two drive coils connected to the slide and which can be translated in the magnetic field produced by the stator magnets.

A drawback of the known device is that the rectilinear guide means for the slide is susceptible to alignment errors of the guide rods; even a slight deviation in the parallel arrangement of the guide rods gives rise to additional friction in the bearing means, which is liable to give rise to stick-slip effects and which may even cause jamming of the slide. Therefore, it is necessary to accurately machine mounting faces on the frame in order to ensure an exact positioning of the guide rods. An additional disadvantage is that the intricate mounting of the guide rods results in a higher cost of the rectilinear guide means and hence a higher cost of the device. These disadvantages become even more serious in view of the general trend towards and the consequent progress in miniaturization.

SUMMARY OF THE INVENTION

Device of the kind defined in the opening paragraph is provided which ensures an accurate and reliable rectilinear guidance for the slide in a simple and cheap way and which is less susceptible to alignment errors.

To this end the first bearing means comprises a first bearing sleeve and a second bearing sleeve through which the first guide rod extends in such a way that the first guide rod and the first bearing sleeve support the slide against movement along the two further axes. The first guide rod and the second bearing sleeve support the slide against movement only along one of the two further axes of the orthogonal triaxial system. The second bearing means comprises a first bearing sleeve through which the second guide rod extends in such a way that the second guide rod and the second bearing means support the slide against movements along the two further axes.

The device is suitable for use where the slide should be capable of rapidly performing accurately defined displacements. The device may be used in optical data-storage equipment, in optical video and audio equipment, and in mechanical precision constructions of other kinds, for example in measuring equipment.

It has been found that the dynamic bearing friction in the bearing means of the device is very low, so that the slide can perform rapid rectilinear movements without producing annoying vibrations in the device. Moreover, as a result of the use of the special bearing means the rectilinear guide means are readily capable of compensating for an out-of-parallel position of the guide rods.

Viewing the preferred embodiment along the rectilinear path of the slide, the first bearing sleeve of the second bearing means is spaced from the first bearing sleeve of the first bearing means and the two first bearing sleeves are identical to each other. The first bearing sleeves of the first and the second bearing means may be constructed as bearing sleeves arranged coaxially around the first guide rod and the second guide rod respectively with a specific clearance. This provides a comparatively large effective bearing surface, which has the additional advantage that the weight of the slide and any further mass carried by the slide is distributed over a larger bearing area. This minimizes friction in the bearing sleeves, which results in minimal wear, so that the slide movement remains accurate even after a long period of use.

Another embodiment is characterized in that the second bearing means further comprises a second bearing sleeve through which the second guide rod extends in such a way that the second guide rod and one of the bearing sleeves of the second bearing means support the slide against movement along one of the two further axes. The second guide rod and the other bearing sleeve of the second bearing means support the slide against movement along the other one of the two further axes. Viewed along the rectilinear path of the slide, the second bearing sleeve of the second bearing means is spaced from the second bearing sleeve of the first bearing means, the two second bearing sleeves being identical to each other.

This embodiment has the advantage that the friction is distributed substantially uniformly between the two guide rods, which is beneficial for a smooth movement of the slide.

The slide together with the bearing sleeves may be a single injection-moulded product.

The invention also relates to an electrodynamic apparatus for translating an objective having an optical axis along a radial path relative to a disc which rotates about an axis of rotation. The apparatus comprises a stationary first magnetic means and a translatable second magnetic means which cooperates magnetically with the first magnetic means as described in Netherlands Patent Application No. 8204981.

An electrodynamic apparatus of the kind defined in the foregoing is provided which is of a simple construction, enabling the objective to be moved along the radial path more rapidly and smoothly than in the known electrodynamic apparatus.

To this end the electrodynamic apparatus comprises a device in accordance with the invention for translating a slide, in which the objective is arranged on the slide and in which one of the two further axes of the orthogonal triaxial system is parallel to the optical axis of the objective.

DETAILED DESCRIPTION OF THE PREFERRED EMBODIMENTS

Figure 1:
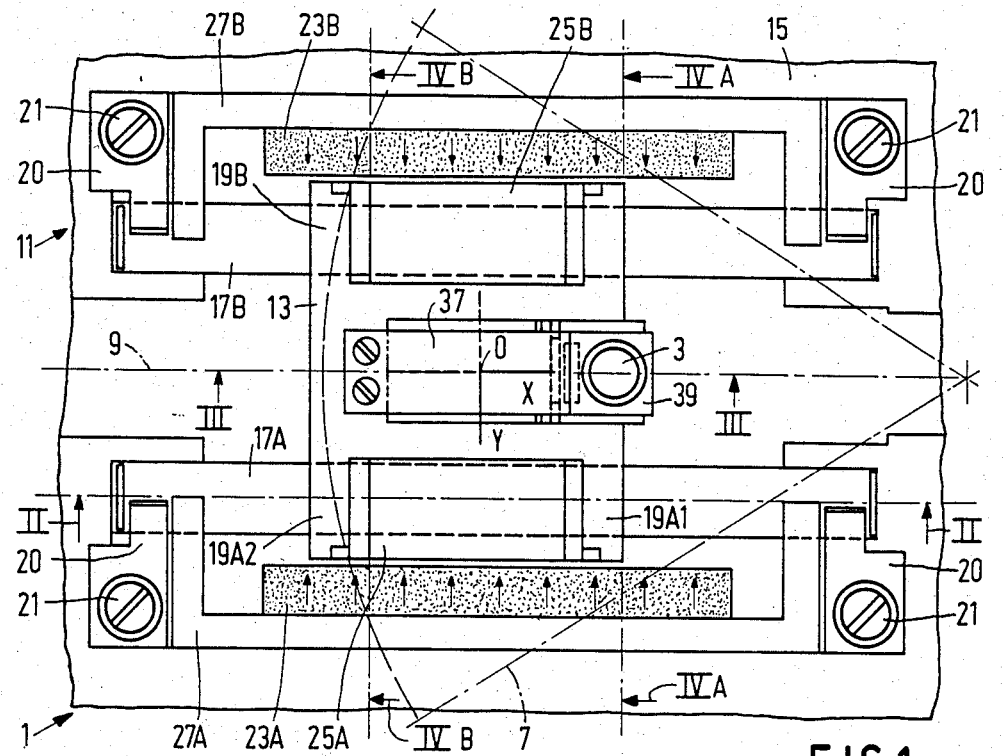
FIG. 1 is a schematic plan view of a symmetrically constructed electrodynamic apparatus.
Figure 2:
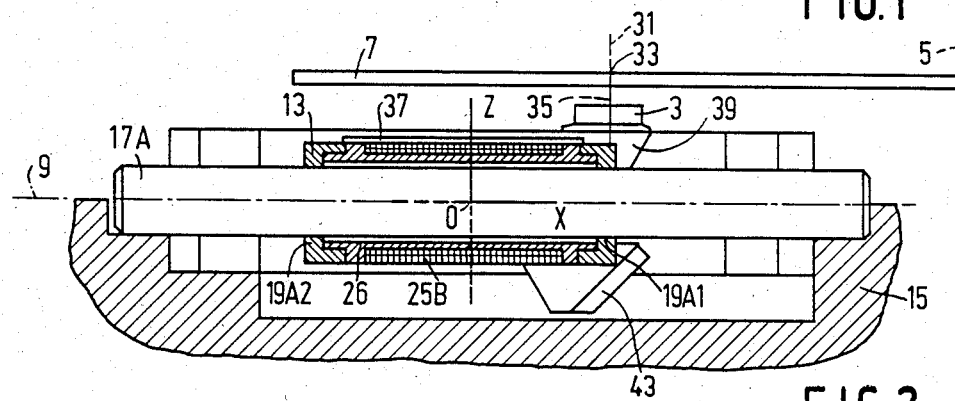
FIG. 2 is a longitudinal sectional view taken on the line II—II in FIG. 1.
Figure 3:
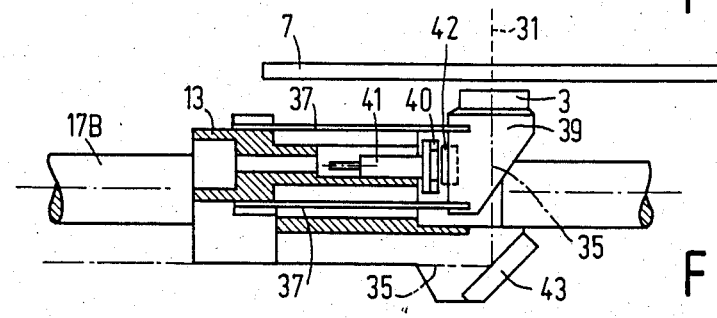
FIG. 3 shows the slide used in the electrodynamic apparatus in a longitudinal sectional view taken on the lines III—III in FIG. 1.

The electrodynamic apparatus 1 shown in FIGS. 1, 2 and 3 serves for translating an objective 3 along a radial path 9 relative to an optical disc 7 which rotates about an axis of rotation 5. A device 11 for translating a slide 13 carrying the objective 3 comprises a frame 15, a first guide rod 17A of circular cross-section, a second guide-rod 17B of circular cross-section which extends parallel to this first guide rod, and first and second bearing means which cooperate with the first and second guide rods respectively. The first bearing means comprises two bearing sleeves 19A1, 19A2 which are arranged on the slide 13 and which are slidable over the first guide rod 17A. The second bearing means comprises only a first bearing sleeve 19B which is integral with the slide 13 and slidable over the second guide rod 17B. The bearing sleeves 19A1, 19A2 and 19B will be described in more detail with reference to FIGS. 4A and 4B.

The ferromagnetic guide rods 17A and 17B are secured to the frame 15 by means of blade springs 20 and bolts 21. The frame 15 further carries two permanent stator magnets 23A and 23B which extend parallel to the guide rods 17A and 17B and which are magnetized in a direction transverse to these rods, which direction of magnetization is indicated by means of arrows in FIG. 1. Two translatable drive coils 25A and 25B of an electrically conductive material are movable in the magnetic field of the stator magnets. The drive coils 25A and 25B are wound on coil formers 26, which are arranged around the guide rods 17A and 17B respectively with ample clearance and which are secured to the slide 13. The magnets 23A and 23B are secured to a stator yoke 27A and 27B respectively of ferromagnetic material.

The objective 3 is movable along its optical axis 31 to enable the movements of the disc 7 to be followed by means of a read spot 33 projected by a radiation beam 35 emitted by a suitable radiation source. The objective 3 is arranged on a mounting 39 which is supported on the slide 13 by means of blade springs 37 secured to the upper side and the lower side of the slide (see also FIG. 3). The mounting 39 with the objective 3 is movable to a limited extent parallel to the optical axis 31 and is electromagnetically drivable by means of an actuator coil 40. This coil is mounted on a coil former 41 on the slide 13 and cooperates with an actuator magnet 42 which is secured to the mounting 39. A mirror 43 is arranged underneath the slide 13 to reflect the radiation beam 35 issuing from a radiation source, not shown, towards the objective 3.

In order to explain the construction and the operation of the rectilinear guide means of the device 11, the drawing shows an orthogonal X-Y-Z triaxial system whose origin O is located on the slide 13. The X-axis coincides with the radial path of the slide 13, the Z-axis extends parallel to the optical axis 31 of the objective 3, and the Y-axis extends perpendicularly both the X-axis and Z-axis and consequently extends tangentially relative to the disc 7. The rectilinear guide means serves to move the slide 13 along the X-axis and also to counteract movements of the slide 13 along the Y-axis and the Z-axis.

Figure 4A:
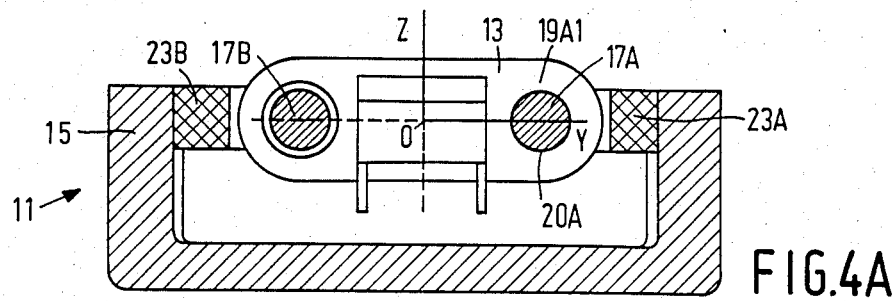
FIG. 4A is a cross-sectional view taken on the lines IVA—IVA in FIG. 1, a part of the device being omitted.
Figure 4B:
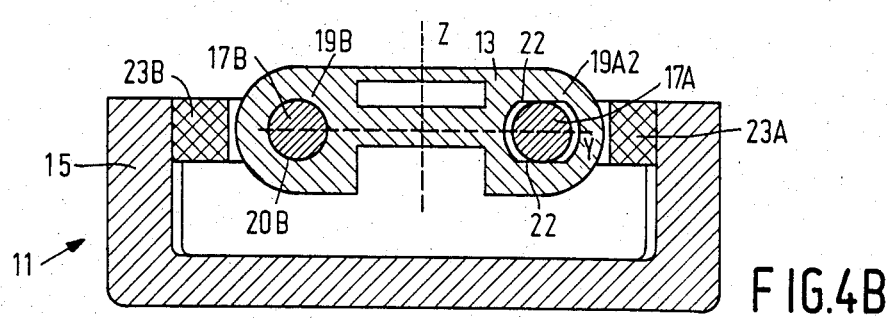
FIG. 4B is a cross-sectional view taken on the lines IVB—IVB in FIG. 1, a part of the device being omitted.

As is apparent from FIGS. 4A and 4B the slide 13 is supported in a special manner by means of the guide rods 17A and 17B and the bearing sleeves 19A1, 19A2 and 19B which cooperate with these rods. The substantially diametrically opposite first bearing sleeves 19A1 and 19B have bearing surfaces 20A and 20B respectively of circularly cylindrical cross-section which are coaxial with the guide rods 17A and 17B respectively. A certain clearance is present between the guide rods 17A and 17B, which have a diameter of 7 mm in the present embodiment, and the first bearing sleeves 19A1 and 19B. This clearance can be comparatively small, for example of the order of magnitude of 10 to 20 $\mu$m, by the use of modern and accurate manufacturing methods. The second bearing sleeve 19A2 of the first bearing means is also arranged around the guide rods 17A but only cooperates with this guide rod in directions parallel to the Z-axis. For this purpose the bearing sleeve 19A2 comprises two planar bearing-surface portions 22 which are oriented transversely of the Z-axis, a suitable clearance of the same order of magnitude as stated above being provided between the bearing-surface portions 22 and the guide rod 17A. The internal parts of the second bearing sleeve 19A2 which are situated between the bearing-surface portions 22 are located at ample distance from the guide rod 17A and do not actually contribute to the bearing function. It is to be noted that the guide rod 17B cooperates with one bearing only, namely the bearing sleeve 19B; for the remainder this guide rod 17B extends through the slide 13 with ample clearance, as is clearly visible in FIG. 4A.

The slide 13 is supported against movement along the Y-axis and the Z-axis of the axial system by the first bearing sleeve 19A1 and the guide rod 17A, and by the first bearing sleeve 19B and the guide rod 17B. The slide 13 is supported only against movement along the Z-axis by the second bearing sleeve 19A2 and the guide rod 17B. This means that, in principle, the slide 13 can only move along the X-axis and that translational movements along the Y-axis and the Z-axis and rotational movements about the three axes of the orthogonal triaxial system are counteracted. However, as a result of the special arrangement and shape of the bearing sleeves an out-of-parallel position of the guide rods 17A and 17B is compensated for without adversely affecting the movements of the slide.

Figure 5A:
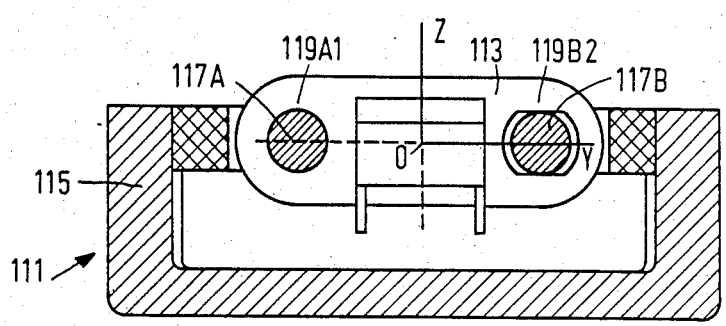
FIG. 5 shows another embodiment of the invention in a cross-sectional view taken on the lines IVA—IVA in FIG. 1.
FIG. 5B shows the latter embodiment in a cross-sectional view taken on the lines IVB—IVB in FIG. 1.
Figure 5B:
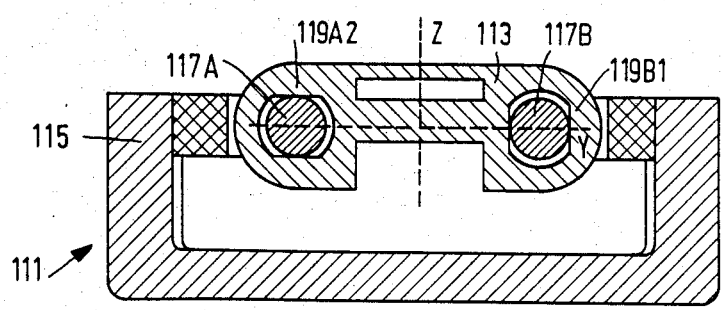

FIGS. 5A and 5B show a device 111 for translating a slide 113, which may serve as an alternative to the device 11 of the electrodynamic apparatus 1 in FIG. 1. The device 111 comprises a frame 115 to which a first guide rod 117A and a second guide rod 117B are secured parallel to one another. The first guide rod 117A cooperates with a first bearing sleeve 119A1 and a second bearing sleeve 19A2 of a first bearing means. The second guide rod 117B cooperates with a first bearing sleeve 119B1 and a second bearing sleeve 119B2 of a second bearing means. The two bearing sleeves 119A2 and 119B2 are identical to each other and, viewed along the X-axis, they are mounted on the slide 113 at a distance from each other. The second bearing sleeves 119A2 and 119B2 together with the guide rods 117A and 117B respectively support the slide 113 against movement only along the Z-axis of the axial system. The first bearing sleeve 119B1 and the guide rod 117B only support the slide against movement along the Y-axis. The first bearing sleeve 119A1 and the guide rod 117A support the slide 113 in against movement along the Y-axis and the Z-axis.

In the present embodiments the bearing sleeves are integral with the slide and are injection-moulded of plastic integrally with the slide; satisfactory results have been obtained with phenolformaldehyde loaded with glass and graphite. For the guide rods a ferromagnetic steel type may be selected, which may be provided with a nickel-teflon layer or a hard-chromium plating in order to prevent corrosion.

What is claimed is:

1. A device for translating a slide, which device comprises a frame and a rectilinear guide means for the slide, which rectilinear guide means comprises mutually parallel first and second guide rods and first bearing means and second bearing means which cooperate with the guide rods to guide the slide relative to the frame in a rectilinear path along a first axis of an orthogonal triaxial system comprising said first axis and two further axes perpendicular thereto, characterized in that the first bearing means comprises a first bearing sleeve and a second bearing sleeve through which the first guide rod extends in such a way that the first guide rod and the first bearing sleeve support the slide against movement along said two further axes and the first guide rod and the second bearing sleeve support said slide against movement only along one of said two further axes of the orthogonal triaxial system and the second bearing means comprises a first bearing sleeve through which the second guide rod extends in such a way that the second guide rod and the first bearing sleeve of said second bearing means support the slide against movement along said two further axes.

2. A device as claimed in claim 1, characterized in that, viewed along the rectilinear path of the slide the first bearing sleeve of the second bearing means is spaced from the first bearing sleeve of the first bearing means and in that the two first bearing sleeves are identical to each other.

3. A device as claimed in claim 1, characterized in that the second bearing means further comprises a second bearing sleeve through which the second guide rod extends in such a way that the second guide rod and one of the bearing sleeves of the second bearing means support the slide against movement along one of said two further axes and the second guide rod and the other bearing sleeve of the second bearing means support the slide against movement along the other one of said two further axes, and in that viewed along the rectilinear path of the slide the second bearing sleeve of the second bearing means is spaced from the second bearing sleeve of the first bearing means, the two bearing sleeves being identical to each other.

4. A device as claimed in claim 1, characterized in that the slide together with the bearing sleeves is constructed as a single injection-moulded product.

5. An electrodynamic apparatus for translating an objective having an optical axis along a radial path relative to a disc which rotates about an axis of rotation, which apparatus comprises a stationary first magnetic means and a translatable second magnetic means which cooperates magnetically with the first magnetic means, characterized in that it comprises a device for translating a slide as claimed in claim 1, in which the objective is arranged on the slide and in which one of said two further axes of the orthogonal triaxial system extends parallel to the optical axis of the objective.

* * * * *